(12) United States Patent
Liu

(10) Patent No.: US 8,869,286 B1
(45) Date of Patent: Oct. 21, 2014

(54) SYSTEMS AND METHODS FOR ANALYZING CLIENT-SIDE STORAGE SECURITY FOR INTERNET APPLICATIONS

(75) Inventor: Yin Liu, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 213 days.

(21) Appl. No.: 13/477,415

(22) Filed: May 22, 2012

(51) Int. Cl.
G06F 11/00 (2006.01)
H04L 29/06 (2006.01)
G06F 21/57 (2013.01)

(52) U.S. Cl.
CPC .......... H04L 63/1433 (2013.01); G06F 21/577 (2013.01)
USPC ............................................... 726/25; 726/26

(58) Field of Classification Search
CPC .............. G06F 21/577; H04L 63/1433; H04L 63/1408
See application file for complete search history.

(56) References Cited

U.S. PATENT DOCUMENTS

| 7,035,854 | B2* | 4/2006 | Hsiao et al. ............................. | 1/1 |
| 8,549,357 | B2* | 10/2013 | Wilson ............................. | 714/25 |
| 2004/0148290 | A1* | 7/2004 | Merenda et al. ................. | 707/10 |
| 2006/0272024 | A1* | 11/2006 | Huang et al. .................... | 726/26 |
| 2007/0022015 | A1* | 1/2007 | Tarinelli et al. ................. | 705/26 |
| 2011/0030061 | A1* | 2/2011 | Artzi et al. ....................... | 726/25 |
| 2011/0145628 | A1* | 6/2011 | Wilson ............................ | 714/4.2 |
| 2013/0091578 | A1* | 4/2013 | Bisht et al. ...................... | 726/25 |
| 2013/0174262 | A1* | 7/2013 | Amit et al. ...................... | 726/25 |
| 2013/0212638 | A1* | 8/2013 | Wilson .............................. | 726/1 |
| 2013/0312102 | A1* | 11/2013 | Brake et al. ..................... | 726/25 |

OTHER PUBLICATIONS

Efraimidis, Pavlos S., et al. "Towards privacy in personal data management." Information Management & Computer Security 17.4 (2009): 311-329.*
William Enck et al., TaintDroid: An Information-Flow Tracking System for Realtime Privacy Monitoring on Smartphones, http://static.usenix.org/event/osdi10/tech/full_papers/Enck.pdf, as accessed on Mar. 1, 2012.

* cited by examiner

Primary Examiner — Jeffrey Pwu
Assistant Examiner — Carlos Amorin
(74) Attorney, Agent, or Firm — ALG Intellectual Property, LLC

(57) ABSTRACT

A computer-implemented method for analyzing client-side storage security for Internet applications may include 1) identifying an interactive Internet resource, 2) identifying at least one input field for entering sensitive data within the interactive Internet resource, 3) identifying at least one instance of local client-side storage performed by the interactive Internet resource by simulating at least one interaction with the interactive Internet resource, and 4) comparing the instance of local client-side storage with a content of the input field to determine that the interactive Internet resource performs local client-side storage of sensitive data. Various other methods, systems, and computer-readable media are also disclosed.

20 Claims, 6 Drawing Sheets

SYSTEMS AND METHODS FOR ANALYZING CLIENT-SIDE STORAGE SECURITY FOR INTERNET APPLICATIONS

BACKGROUND

In the electronic information age, individuals and organizations may quickly and easily share, access, and disseminate high volumes of information. For many individuals and organizations, the ease with which information may be disseminated electronically is empowering. However, the ubiquity of high-speed Internet access and smart mobile devices may pose unique challenges for individuals and organizations concerned with preventing the loss and/or exposure of sensitive data. Due to the growing use of Internet applications, improper data handling by Internet applications may pose a significant threat to data loss and exposure.

Some Internet applications that allow users to enter sensitive data may create local caches of the sensitive data. Unfortunately, these local caches may be vulnerable to attacks, such as cross-site scripting attacks. Traditional security systems may protect against data loss through local data caches by scanning locally-stored data (e.g., cookies) for sensitive data, removing cookies, and/or instructing users to remove cookies. Unfortunately, new standards for locally storing Internet application data (e.g., HTML5) may interfere with traditional scanning techniques. Furthermore, some mobile computing platforms may be restricted and/or closed, discouraging and/or preventing users from installing software of their choice and/or from installing system-level software that would provide sufficient access for a data loss prevention system to access data stored locally by Internet applications. Accordingly, the instant disclosure identifies and addresses a need for additional and improved systems and methods for analyzing client-side storage security for Internet applications.

SUMMARY

As will be described in greater detail below, the instant disclosure generally relates to systems and methods for analyzing client-side storage security for Internet applications by simulating interactions with Internet applications to track sensitive inputs that are provided to the Internet applications and later locally stored. In one example, a computer-implemented method for analyzing client-side storage security for Internet applications may include 1) identifying an interactive Internet resource, 2) identifying at least one input field for entering sensitive data within the interactive Internet resource, 3) identifying at least one instance of local client-side storage performed by the interactive Internet resource by simulating at least one interaction with the interactive Internet resource, and 4) comparing the instance of local client-side storage with a content of the input field to determine that the interactive Internet resource performs local client-side storage of sensitive data.

In some examples, identifying the input field may include parsing the interactive Internet resource to identify the input field. In some embodiments, the computer-implemented method may additionally include generating a security rating for the interactive Internet resource based at least in part on the determination that the interactive Internet resource performs local client-side storage of sensitive data. In one example, the computer-implemented method may also include 1) storing a relationship between the interactive Internet resource and the instance of local client-side storage and 2) providing the relationship to a client capable of accessing the interactive Internet resource to facilitate removal of the sensitive data by the client.

In some embodiments, simulating the interaction may include 1) identifying a document of the interactive Internet resource including the input field, 2) identifying at least one script of the interactive Internet resource, and 3) executing the script in context of the document. Additionally or alternatively, simulating the interaction may include 1) identifying at least one script of the interactive Internet resource, 2) identifying at least one object with which the script is configured to interact, and 3) providing a mock object in place of the object. In some examples, simulating the interaction may include performing a symbolic execution of the interactive Internet resource. Additionally or alternatively, simulating the interaction may include performing a static analysis of the interactive Internet resource. In one example, simulating the interaction may include identifying at least one instance of network transmission of the content of the input field.

In one embodiment, a system for implementing the above-described method may include 1) an identification module programmed to identify an interactive Internet resource, 2) a detection module programmed to identify at least one input field for entering sensitive data within the interactive Internet resource, 3) a simulation module programmed to identify at least one instance of local client-side storage performed by the interactive Internet resource by simulating at least one interaction with the interactive Internet resource, and 4) a comparison module programmed to compare the instance of local client-side storage with a content of the input field to determine that the interactive Internet resource performs local client-side storage of sensitive data. The system may also include at least one processor configured to execute the identification module, the detection module, the simulation module, and the comparison module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify an interactive Internet resource, 2) identify at least one input field for entering sensitive data within the interactive Internet resource, 3) identify at least one instance of local client-side storage performed by the interactive Internet resource by simulating at least one interaction with the interactive Internet resource, and 4) compare the instance of local client-side storage with a content of the input field to determine that the interactive Internet resource performs local client-side storage of sensitive data.

As will be explained in greater detail below, by simulating interactions with Internet applications to track sensitive inputs that are provided to the Internet applications and later locally stored, the systems and methods described herein may determine which Internet applications locally store sensitive data. Accordingly, in some examples these systems and methods may provide and/or use information about Internet applications that locally store sensitive data to provide security ratings for Internet applications and/or remove sensitive locally-stored data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
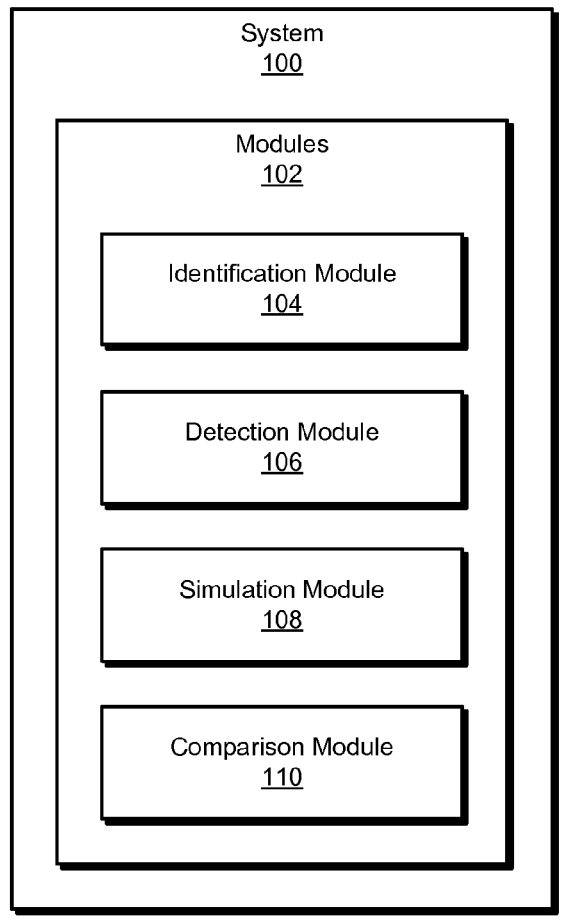
FIG. 1 is a block diagram of an exemplary system for analyzing client-side storage security for Internet applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
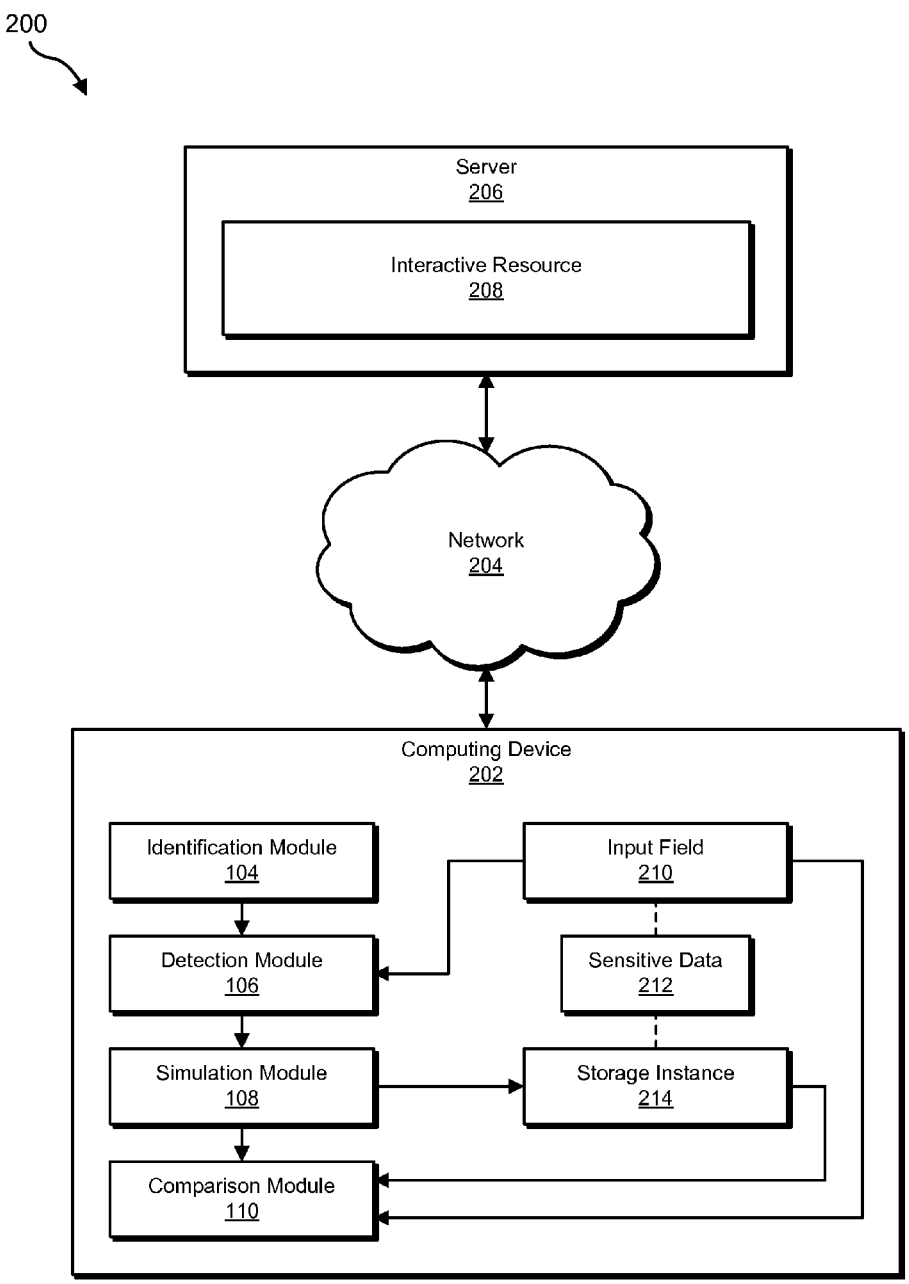
FIG. 2 is a block diagram of an exemplary system for analyzing client-side storage security for Internet applications.
Figure 3:
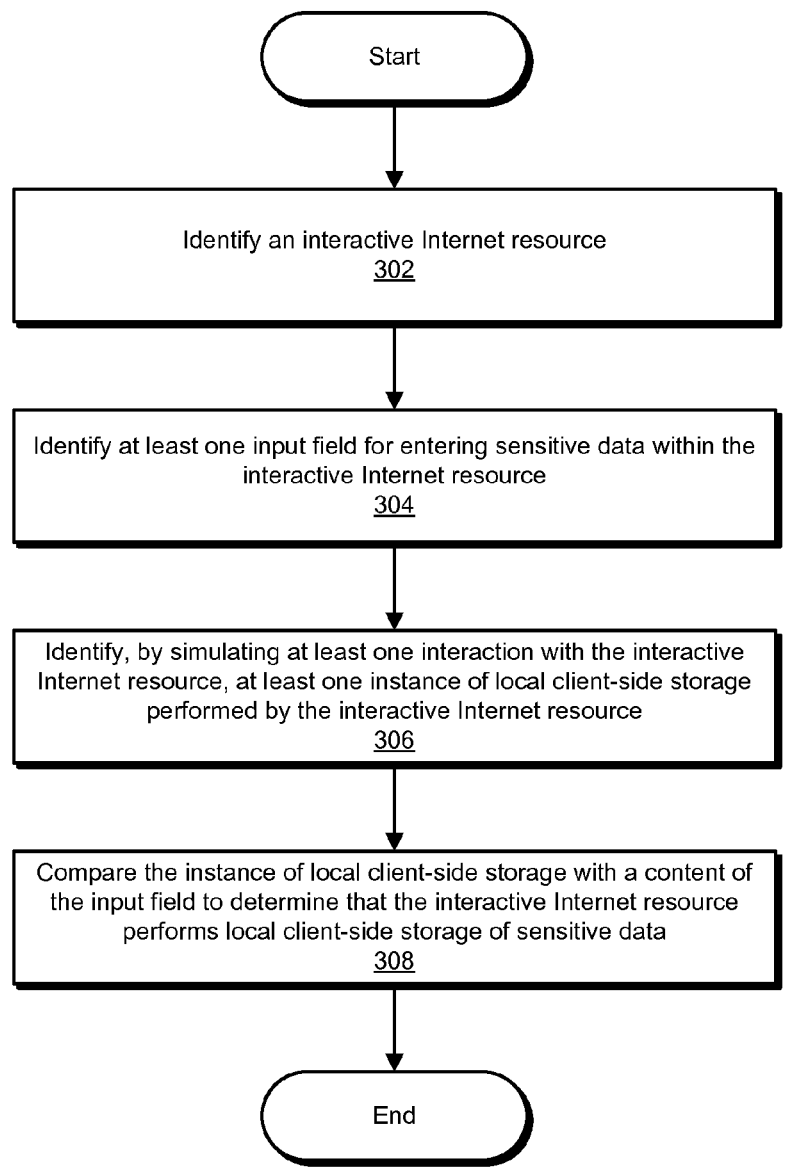
FIG. 3 is a flow diagram of an exemplary method for analyzing client-side storage security for Internet applications.
Figure 4:
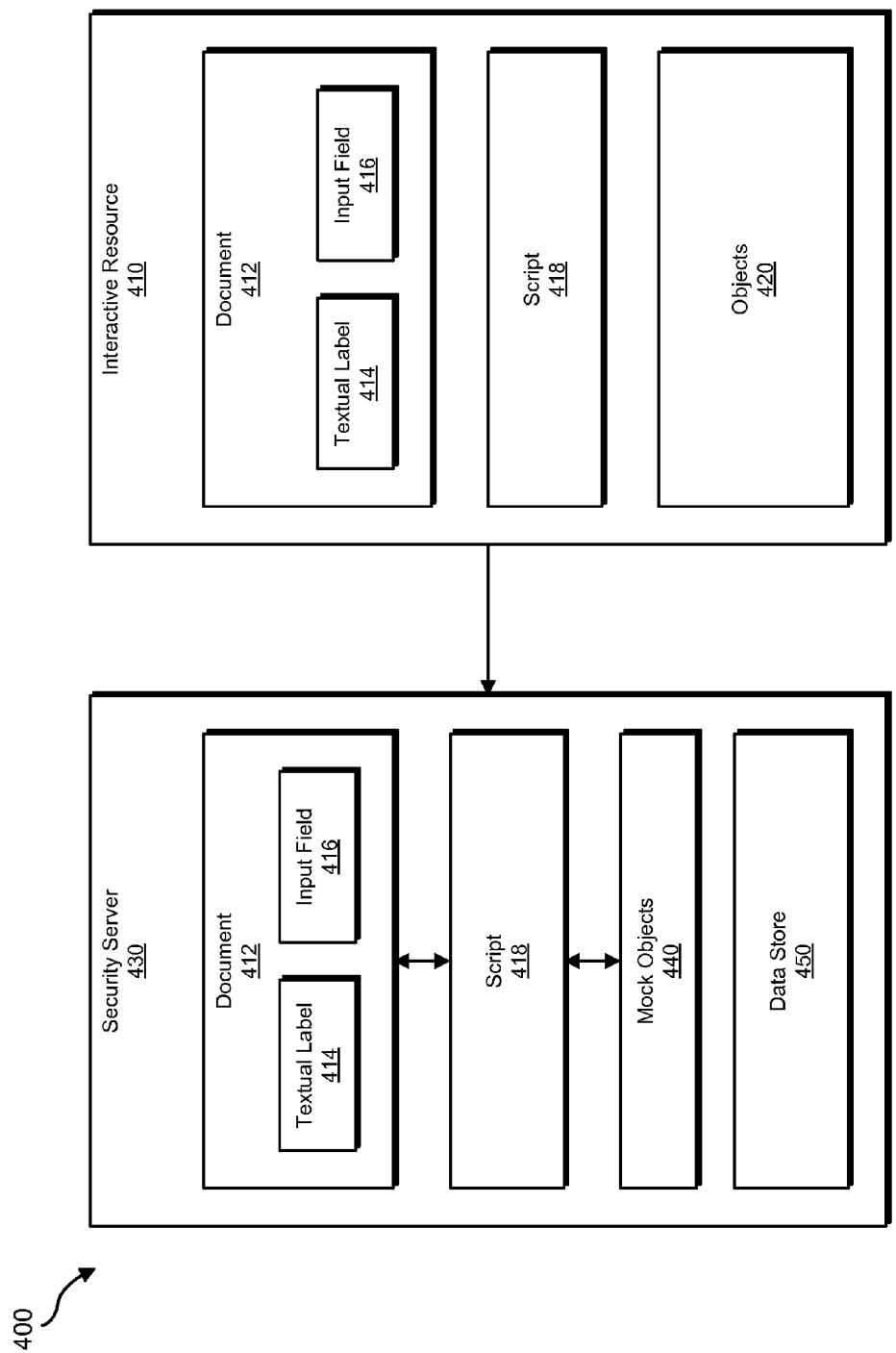
FIG. 4 is a block diagram of an exemplary system for analyzing client-side storage security for Internet applications.

The following will provide, with reference to FIGS. 1, 2, and 4, detailed descriptions of exemplary systems for analyzing client-side storage security for Internet applications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for analyzing client-side storage security for Internet applications. As illustrated in this figure, exemplary system 100 may include one or more modules 102 for performing one or more tasks. For example, and as will be explained in greater detail below, exemplary system 100 may include an identification module 104 programmed to identify an interactive Internet resource. Exemplary system 100 may also include a detection module 106 programmed to identify at least one input field for entering sensitive data within the interactive Internet resource.

In addition, and as will be described in greater detail below, exemplary system 100 may include a simulation module 108 programmed to identify at least one instance of local client-side storage performed by the interactive Internet resource by simulating at least one interaction with the interactive Internet resource. Exemplary system 100 may also include a comparison module 110 programmed to compare the instance of local client-side storage with a content of the input field to determine that the interactive Internet resource performs local client-side storage of sensitive data. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. For example, computing device 202 may access an interactive resource 208 from a server 206 (e.g., for use and/or analysis of interactive resource 208).

In one embodiment, one or more of modules 102 from FIG. 1 may, when executed by at least one processor of computing device 202, facilitate computing device 202 in analyzing client-side storage security for Internet applications. For example, and as will be described in greater detail below, one or more of modules 102 may cause computing device 202 to 1) identify interactive resource 208, 2) identify at least one input field 210 for entering sensitive data (e.g., sensitive data 212) within the interactive resource 208, 3) identify at least one instance of local client-side storage (e.g., a storage instance 214 local to computing device 202) performed by the interactive resource 208 by simulating at least one interaction with the interactive resource 208, and 4) compare storage instance 214 with the content of input field 210 to determine that the interactive resource 208 performs local client-side storage of sensitive data (e.g., sensitive data 212).

Computing device 202 generally represents any type or form of computing device capable of reading computer-executable instructions. Examples of computing device 202 include, without limitation, servers, desktops, laptops, tablets, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of hosting and/or providing Internet resources. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for analyzing client-side storage security for Internet applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify an interactive Internet resource. For example, at step 302 identification module 104 may, as part of computing device 202 in FIG. 2, identify interactive resource 208.

As used herein, the phrase "interactive Internet resource" may refer to any resource, application, and/or service made available via the Internet and/or any other suitable network. In some examples, the interactive Internet resource may include one or more documents, scripts, and/or interface elements. In some examples, an interactive Internet resource may include a resource for retrieval to a client system (e.g., and execution on the client system). For example, the interactive Internet resource may include one or more web documents and scripts for display and execution in a client-side web browser. Additionally or alternatively, the interactive Internet resource may include one or more server-side objects (e.g., executable elements, databases, etc.) referenced by, called by, and/or queried by a client-side portion of the interactive Internet resource. In some examples, as will be explained in greater detail below, the interactive Internet resource may use client-side storage to locally store data—including, e.g., sensitive data.

Identification module 104 may identify the interactive Internet resource in any suitable manner. For example, identification module 104 may crawl the Internet for interactive Internet applications and/or receive information identifying the interactive Internet resource from a web crawler. Additionally or alternatively, identification module 104 may identify the interactive Internet resource by identifying a database of interactive Internet resources accessed by one or more clients (e.g., clients with a subscription to a security service and configured to contribute information to the security service). In some examples, identification module 104 may identify the interactive Internet resource by receiving a security query about the interactive Internet resource. In at least one example, identification module 104 may identify the interactive Internet resource by intercepting and/or observing an attempt to access and/or use the interactive Internet resource. In some examples, identification module 104 may identify the interactive Internet resource by identifying a database of web applications configured and/or available for use from mobile computing platforms (e.g., that restrict access to data locally-stored by web applications).

In some examples, identification module 104 may also retrieve one or more components of the interactive Internet resource. For example, identification module 104 may retrieve one or more web documents and/or scripts from a server hosting the interactive Internet resource.

FIG. 4 shows an exemplary system 400 for analyzing client-side storage security for Internet applications. As shown in FIG. 4, exemplary system 400 may include an interactive resource 410 and a security server 430. Using FIG. 4 as an example, at step 302 identification module 104 may (e.g., as a part of security server 430) identify interactive resource 410.

Returning to FIG. 3, at step 304 one or more of the systems described herein may identify at least one input field for entering sensitive data within the interactive Internet resource. For example, at step 304 detection module 106 may, as part of computing device 202 in FIG. 2, identify at least one input field 210 for entering sensitive data (e.g., sensitive data 212) within the interactive resource 208.

As used herein, the phrase "input field" may refer to any element and/or component of an interactive Internet resource capable of receiving, storing, and/or relaying information from a client system and/or a user of the client system. Examples of input fields include, without limitation, text fields, combo boxes, checkboxes, radio buttons, file selectors, calendar date selectors, slider input elements, and/or sketchpads. In some examples the phrase "input field" may refer to an element of a web form.

As used herein, the phrase "sensitive data" may refer to any data that is confidential, private, personal, and/or designated to not be public and/or indiscriminately shared. For example, the phrase "sensitive data" may refer to data submitted for use by a selected Internet application but not to be used by any third-parties. Additionally or alternatively, the phrase "sensitive data" may refer to any type of data identified by a data security policy as sensitive. Examples of sensitive data may include, without limitation, financial account information (e.g., bank account information, credit card information), social security numbers, personal and/or private information (e.g., names, telephone numbers, addresses, etc.), and authentication information (e.g., usernames, passwords, etc.).

The input field may be designed to receive any of a variety of types of information. For example, the input field may be designed to receive sensitive information, such as financial account information (e.g., bank account information, credit card information) or social security numbers. In another example, the input field may be designed to receive personal and/or private information such as a name, a telephone number, or an address. As another example, the input field may be designed to receive authentication information, such as a username or a password.

Detection module 106 may identify the input field in any suitable manner. For example, detection module 106 may identify the input field by parsing the interactive Internet resource (e.g., a document of the interactive Internet resource) to identify the input field. For example, detection module 106 may identify a web page of a web application and parse the web page to extract the Document Object Model structure of the web page and identify any input fields that appear to accept and/or request sensitive data. For example, detection module 106 may parse the interactive Internet resource to identify a textual label associated with the input field that indicates sensitive data. In this example, detection module 106 may determine that the textual label includes a keyword associated with one or more categories of sensitive data (e.g., one of the types of sensitive data described earlier, such as credit card information).

Detection module 106 may identify the textual label associated with the input field in any suitable manner. For example, detection module 106 may determine that the textual label is proximate to the input field (e.g., directly precedes and/or follows the input field). Additionally or alternatively, detection module 106 may determine that the textual label is associated with a form and/or table that encloses the input field. In some examples, the textual label may include text to be rendered (e.g., a visual label for a user). Additionally or alternatively, the textual label may include a description and/or name of the input field and/or an element related to the input field. For example, a description of the input field may include the text "card number" and a contextual element of the input field may include the text "payment." Accordingly, detection module 106 may match the text to determine that the input field is related to credit card information (and, therefore, sensitive information).

Using FIG. 4 as an example, one or more of the systems described herein may retrieve elements of interactive resource 410 to security server 430 (e.g., identification module 104 may retrieve a document 412 including a textual label 414 and an input field 416 and may also retrieve a script 418). In this example, detection module 106 may identify input field 416 by parsing document 412. Additionally, in some examples, detection module 106 may determine that input field 416 is configured and/or intended for sensitive data by determining that textual label 414 indicates sensitive data and is associated with input field 416.

Returning to FIG. 3, at step 306 one or more of the systems described herein may identify at least one instance of local client-side storage performed by the interactive Internet resource by simulating at least one interaction with the interactive Internet resource. For example, at step 306 simulation module 108 may, as part of computing device 202 in FIG. 2, identify at least one instance of local client-side storage (e.g., a storage instance 214 local to computing device 202) performed by the interactive resource 208 by simulating at least one interaction with the interactive resource 208.

The instance of local client-side storage may include any suitable method of local client-side storage. For example, the instance of local client-side storage may include a usage of an HTML5 client-side storage feature (e.g., HTML5 local storage, HTML5 database storage, HTML5 session storage, etc.). In some examples, the instance of local client-side storage may include an instance of storage on a mobile computing device. Additionally or alternatively, the instance of local client-side storage may include storage that is not accessible by third-party software systems installed on a client device.

Simulation module 108 may simulate the interaction with the interactive Internet resource in any of a variety of ways. For example, simulation module 108 may 1) identify a document of the interactive Internet resource including the input field, 2) identify at least one script of the interactive Internet resource, and 3) execute the script in context of the document. For example, simulation module 108 may identify the document and script previously retrieved by one or more of the systems described herein (e.g., identification module 104) from a server hosting the interactive Internet resource. For example, the document may include an HTML document, and the script may include a JavaScript script (e.g., that is embedded in and/or included from the document and that interacts with the Document Object Model of the document).

In some examples, simulation module 108 may simulate the interaction by 1) identifying at least one script of the interactive Internet resource, 2) identifying at least one object with which the script is configured to interact, and 3) providing a mock object in place of the object. The object may include any object that would be available to the script in a genuine interaction with the interactive Internet resource but which is replaced by the mock object during the simulated interaction with the interactive Internet resource. For example, the object may include a server-side object not retrieved and/or statically retrievable from a server hosting the interactive Internet resource (e.g., executable elements, databases, etc.) and/or that is referenced by, called by, and/or queried by a client-side portion of the interactive Internet resource. In some examples, the object may include a client-side storage object and/or a Document Object Model object. In some examples, the mock object may include one or more functionalities of the object, including, e.g., a statefulness expected of the object.

In some examples, simulation module 108 may simulate the interaction by performing a symbolic execution of the interactive Internet resource. As used herein, the phrase "symbolic execution" may refer to any process of analyzing an application that tracks symbolic (e.g., instead of actual) inputs to the application. In one example, the symbolic execution may include interpreting a script given a symbolic value as input and tracing one or more execution paths. In some examples, simulation module 108 may perform the symbolic execution for one or more events created by user interaction (e.g., simulation module 108 may perform the symbolic execution for every such event). Additionally or alternatively, simulation module 108 may perform the symbolic execution by interpreting each code execution branch.

In some examples, simulation module 108 may simulate the interaction by performing a static analysis of the interactive Internet resource. As used herein, the phrase "static analysis" may refer to any process of analyzing an application and/or a portion of the application without executing the application or the portion of the application. For example, simulation module 108 may use static analysis to identify a behavior of an execution branch instead of interpreting the execution branch with a dynamic analysis method.

In some examples, simulation module 108 may identify at least one instance of network transmission of the content of the input field. For example, simulation module 108 may determine that the interactive Internet resource potentially transmits sensitive data to an unexpected and/or unauthorized location.

Using FIG. 4 as an example, simulation module 108 may simulate an interaction with interactive resource 410 by statically analyzing, dynamically analyzing, and/or symbolically executing script 418 (e.g., in context of document 412) to determine whether at least a portion of the contents of input field 416 are stored in a data store 450 (e.g., in original form and/or in a modified form). In some examples, simulation module 108 may provide mock objects 440 for script 418 to function without actually interacting with interactive resource 410.

Returning to FIG. 3, at step 308 one or more of the systems described herein may compare the instance of local client-side storage with a content of the input field to determine that the interactive Internet resource performs local client-side storage of sensitive data. For example, at step 308 comparison module 110 may, as part of computing device 202 in FIG. 2, compare storage instance 214 with the content of input field 210 to determine that the interactive resource 208 performs local client-side storage of sensitive data (e.g., sensitive data 212).

Comparison module 110 may compare the content of the input field to the instance of local client-side storage in any suitable manner. For example, comparison module 110 may determine that a symbolic value entered by way of the input field is traceable to the instance of local client-side storage. Additionally or alternatively, comparison module 110 may determine a similarity between the content of input field 416 and the instance of local client-side storage.

Using FIG. 4 as an example, at step 308 comparison module 110 may compare the content of input field 416 with data store 450 to determine that interactive resource 410 causes local storage of sensitive data.

In some examples, comparison module 110 may also use the determination that the interactive Internet resource performs local client-side storage of sensitive data to protect against a potential security hole of the interactive Internet resource. For example, comparison module 110 may generate a security rating for the interactive Internet resource based at least in part on the determination that the interactive Internet resource performs local client-side storage of sensitive data. In this example, comparison module 110 may publish the rating, provide the rating to a security vendor, provide the rating to a user, and/or use the rating to determine a security process required for interaction with the interactive Internet resource.

In one example, comparison module 110 may also 1) store a relationship between the interactive Internet resource and the instance of local client-side storage and 2) provide the relationship to a client capable of accessing the interactive Internet resource to facilitate removal of the sensitive data by the client. For example, comparison module 110 may update a database of interactive Internet resources with information that the interactive Internet resource may locally store sensitive data. Comparison module 110 may then provide the database (and/or an update of the database) to one or more client systems configured to remove local storage for interactive Internet resources that locally store sensitive data.

As explained above, by simulating interactions with Internet applications to track sensitive inputs that are provided to the Internet applications and later locally stored, the systems and methods described herein may determine which Internet applications locally store sensitive data. Accordingly, in some examples these systems and methods may provide and/or use information about Internet applications that locally store sensitive data to provide security ratings for Internet applications and/or remove sensitive locally-stored data.

Figure 5:
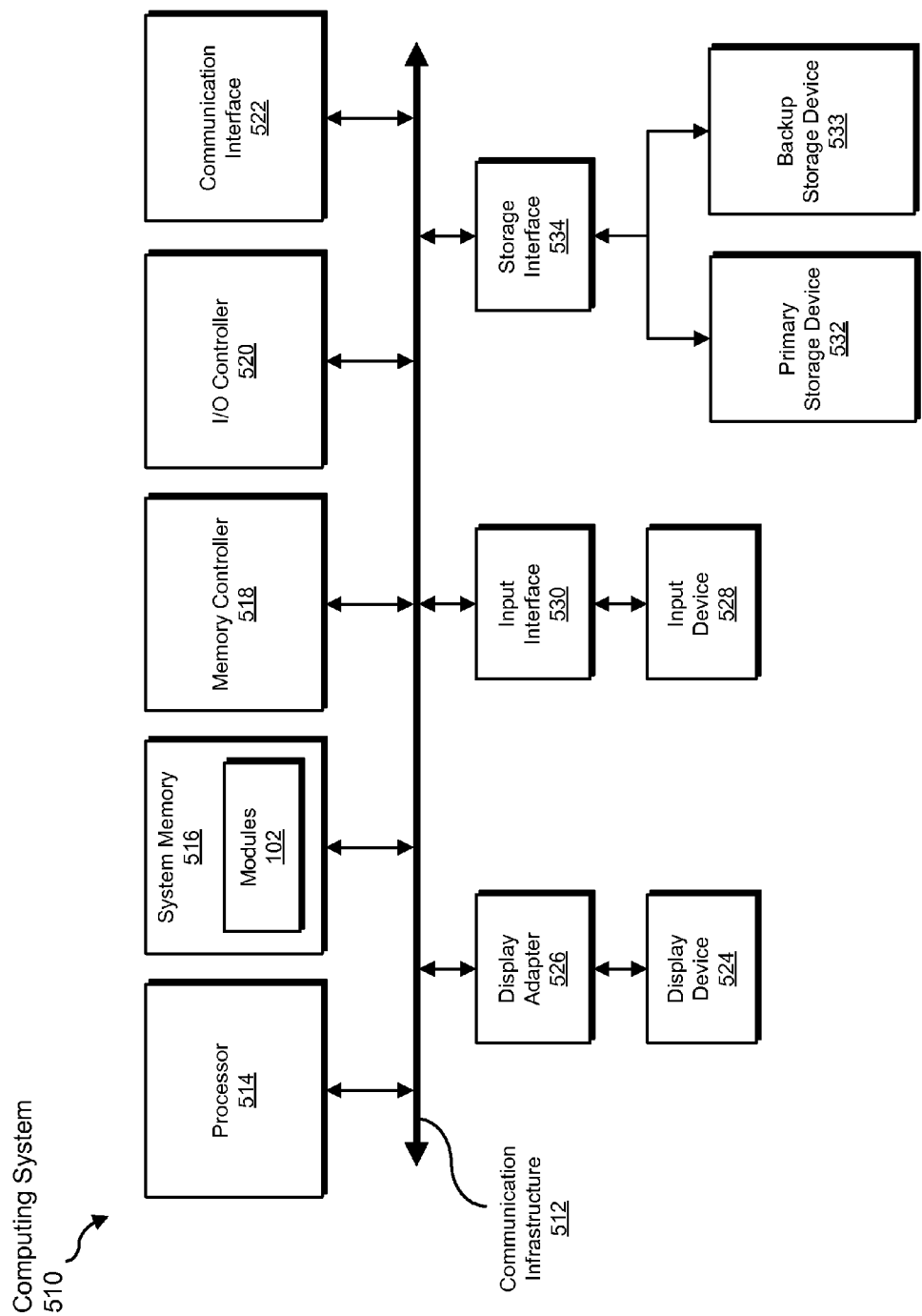
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, parsing, simulating, executing, providing, performing, generating, and storing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
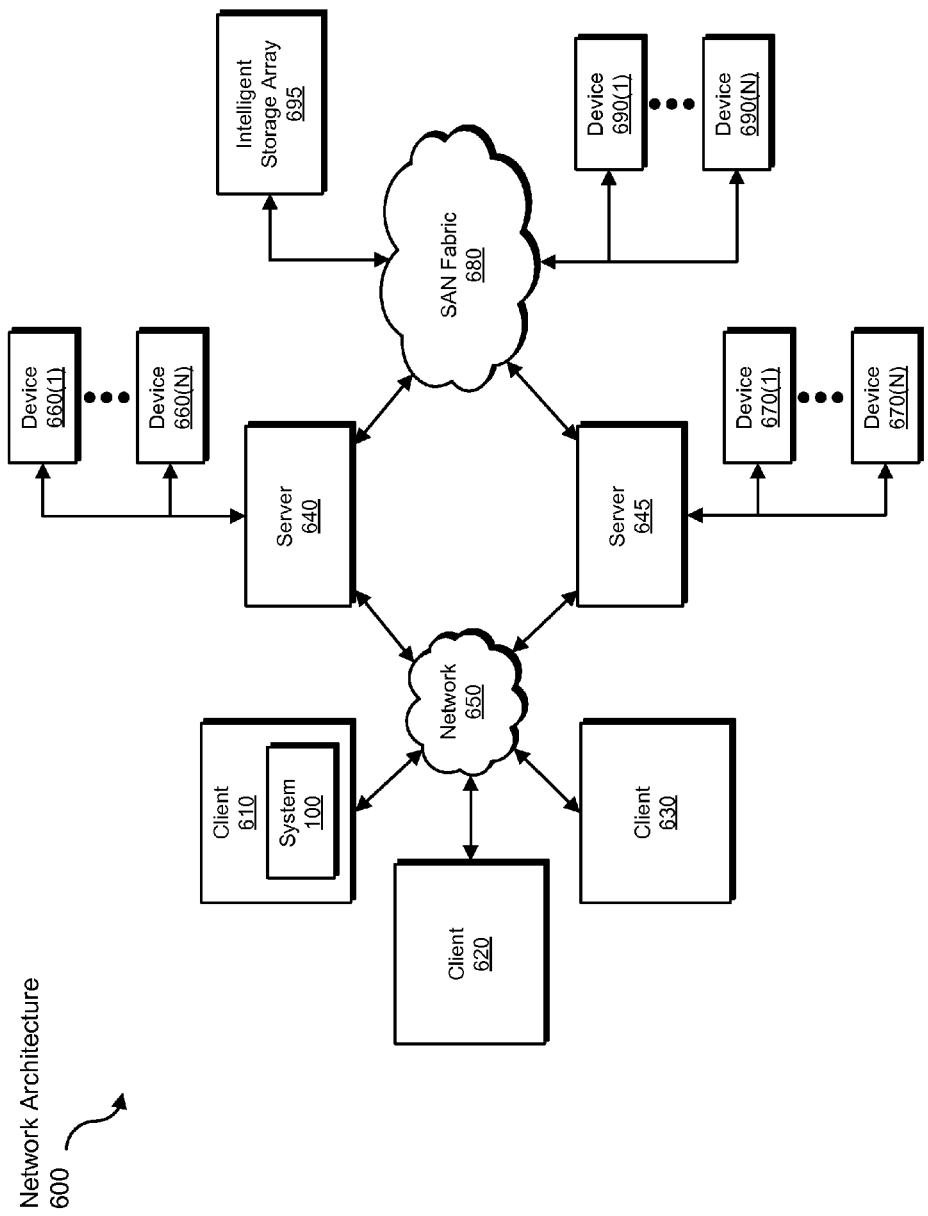
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, parsing, simulating, executing, providing, performing, generating, and storing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for analyzing client-side storage security for Internet applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for analyzing client-side storage security for Internet applications.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for analyzing client-side storage security for Internet applications, at least a portion of the method being performed by a computing device comprising at least one processor, the method comprising:
   identifying, by the computing device, an interactive Internet resource;
   identifying, by the computing device, at least one input field for entering sensitive data within the interactive Internet resource;
   identifying, by the computing device, by simulating at least one interaction with the interactive Internet resource that generates a content of the input field, at least one instance of local client-side storage performed by the interactive Internet resource;
   comparing, by the computing device, the instance of local client-side storage with the content of the input field to determine that the interactive Internet resource performs local client-side storage of sensitive data.

2. The computer-implemented method of claim 1, wherein identifying the input field for sensitive data within the interactive Internet resource comprises:
   parsing the interactive Internet resource to identify the input field;
   parsing the interactive Internet resource to identify a textual label associated with the input field that indicates sensitive data.

3. The computer-implemented method of claim 1, wherein simulating the interaction with the interactive Internet resource comprises:
- identifying a document of the interactive Internet resource comprising the input field;
- identifying at least one script of the interactive Internet resource;
- executing the script in context of the document.

4. The computer-implemented method of claim 1, wherein simulating the interaction with the interactive Internet resource comprises:
- identifying at least one script of the interactive Internet resource;
- identifying at least one object with which the script is configured to interact;
- providing a mock object in place of the object.

5. The computer-implemented method of claim 1, wherein simulating the interaction with the interactive Internet resource comprises performing a symbolic execution of the interactive Internet resource.

6. The computer-implemented method of claim 1, wherein simulating the interaction with the interactive Internet resource comprises performing a static analysis of the interactive Internet resource.

7. The computer-implemented method of claim 1, further comprising generating a security rating for the interactive Internet resource based at least in part on the determination that the interactive Internet resource performs local client-side storage of sensitive data.

8. The computer-implemented method of claim 1, further comprising:
- storing a relationship between the interactive Internet resource and the instance of local client-side storage;
- providing the relationship to a client capable of accessing the interactive Internet resource to facilitate removal of the sensitive data by the client.

9. The computer-implemented method of claim 1, wherein simulating the interaction with the interactive Internet resource comprises identifying at least one instance of network transmission of the content of the input field.

10. A system for analyzing client-side storage security for Internet applications, the system comprising:
- an identification module programmed to identify an interactive Internet resource;
- a detection module programmed to identify at least one input field for entering sensitive data within the interactive Internet resource;
- a simulation module programmed to identify, by simulating at least one interaction with the interactive Internet resource that generates a content of the input field, at least one instance of local client-side storage performed by the interactive Internet resource;
- a comparison module programmed to compare the instance of local client-side storage with the content of the input field to determine that the interactive Internet resource performs local client-side storage of sensitive data;
- at least one hardware processor configured to execute the identification module, the detection module, the simulation module, and the comparison module.

11. The system of claim 10, wherein the detection module is programmed to identify the input field for sensitive data within the interactive Internet resource by:
- parsing the interactive Internet resource to identify the input field;
- parsing the interactive Internet resource to identify a textual label associated with the input field that indicates sensitive data.

12. The system of claim 10, wherein the simulation module is programmed to simulate the interaction with the interactive Internet resource by:
- identifying a document of the interactive Internet resource comprising the input field;
- identifying at least one script of the interactive Internet resource;
- executing the script in context of the document.

13. The system of claim 10, wherein the simulation module is programmed to simulate the interaction with the interactive Internet resource by:
- identifying at least one script of the interactive Internet resource;
- identifying at least one object with which the script is configured to interact;
- providing a mock object in place of the object.

14. The system of claim 10, wherein the simulation module is programmed to simulate the interaction with the interactive Internet resource by performing a symbolic execution of the interactive Internet resource.

15. The system of claim 10, wherein the simulation module is programmed to simulate the interaction with the interactive Internet resource by performing a static analysis of the interactive Internet resource.

16. The system of claim 10, wherein the comparison module is further programmed to generate a security rating for the interactive Internet resource based at least in part on the determination that the interactive Internet resource performs local client-side storage of sensitive data.

17. The system of claim 10, wherein the comparison module is further programmed to:
- store a relationship between the interactive Internet resource and the instance of local client-side storage;
- provide the relationship to a client capable of accessing the interactive Internet resource to facilitate removal of the sensitive data by the client.

18. The system of claim 10, wherein the simulation module is programmed to simulate the interaction with the interactive Internet resource by identifying at least one instance of network transmission of the content of the input field.

19. A non-transitory computer-readable-storage medium comprising one or more computer-executable instructions that, when executed by at least one processor of a computing device, cause the computing device to:
- identify an interactive Internet resource;
- identify at least one input field for entering sensitive data within the interactive Internet resource;
- identify, by simulating at least one interaction with the interactive Internet resource that generates a content of the input field, at least one instance of local client-side storage performed by the interactive Internet resource;
- compare the instance of local client-side storage with the content of the input field to determine that the interactive Internet resource performs local client-side storage of sensitive data.

20. The computer-readable-storage medium of claim 19, wherein the one or more computer-executable instructions cause the computing device to identify the input field for sensitive data within the interactive Internet resource by causing the computing device to:
- parse the interactive Internet resource to identify the input field;
- parse the interactive Internet resource to identify a textual label associated with the input field that indicates sensitive data.

* * * * *